United States Patent [19]

Kim

[11] Patent Number: 5,429,285
[45] Date of Patent: Jul. 4, 1995

[54] RECEPTACLE ADAPTED FOR CAR

[76] Inventor: Tae-hyung Kim, 2-702, Sambo mansion, 580-4, Yusan 1-dong, Dngrae-ku, Pusan-si, Kyeongsangnam-do, Rep. of Korea

[21] Appl. No.: 219,155

[22] Filed: Mar. 29, 1994

[30] Foreign Application Priority Data

Sep. 9, 1993 [KR] Rep. of Korea ............... 1993-17941

[51] Int. Cl.⁶ ............................................. B62D 43/00
[52] U.S. Cl. .............................. 224/42.14; 224/42.12; 206/373; 206/573
[58] Field of Search ............... 224/42.12, 42.13, 42.14, 224/42.2, 42.24; 206/373, 573, 803, 372; 220/327, 288, 521, 212; 301/37.1, 37.28, 38.1

[56] References Cited

U.S. PATENT DOCUMENTS

| | | | |
|---|---|---|---|
| 1,008,680 | 11/1911 | Temple | 224/42.14 |
| 1,666,012 | 4/1928 | Humphrey | 220/212.5 |
| 2,852,174 | 9/1958 | Mauerer | 224/42.14 |
| 4,245,753 | 1/1981 | Ellis | 220/288 |
| 4,498,614 | 2/1985 | Guarr | 224/42.14 |
| 4,830,241 | 5/1989 | Ulmer et al. | 224/42.2 |
| 4,830,579 | 5/1989 | Cheng | 206/573 |
| 4,917,279 | 4/1990 | Brow et al. | 224/42.14 |
| 5,004,103 | 4/1991 | Connors et al. | 206/372 |
| 5,118,017 | 6/1992 | Buck | 224/42.14 |

FOREIGN PATENT DOCUMENTS

| | | | |
|---|---|---|---|
| 2804382 | 8/1979 | Germany | 224/42.14 |
| 3140321 | 4/1983 | Germany | 224/42.2 |
| 3830228 | 3/1990 | Germany | 224/42.2 |
| 4103652 | 8/1992 | Germany | 224/42.13 |
| 294930 | 2/1954 | Switzerland | 224/42.14 |
| 2250248 | 6/1992 | United Kingdom | 224/42.14 |

Primary Examiner—Henry J. Recla
Assistant Examiner—Gregory M. Vidovich
Attorney, Agent, or Firm—Christie, Parker & Hale

[57] ABSTRACT

A receptacle which is installed inside a rim of a spare wheel mounted in a car trunk. The receptacle has a bowl including a circular side wall and a bottom having a fixing hole, an overall shape of the bowl being capable of substantially snugly fit inside a rim of a spare wheel, and a cap for detachably covering the bowl. The receptacle can be used as a container for storing various objects which would have been easily scattered otherwise, a reservoir for containing liquid, e.g. lubricant when refilling the antifreeze, a toolbox, and a portable traffic sign.

7 Claims, 5 Drawing Sheets

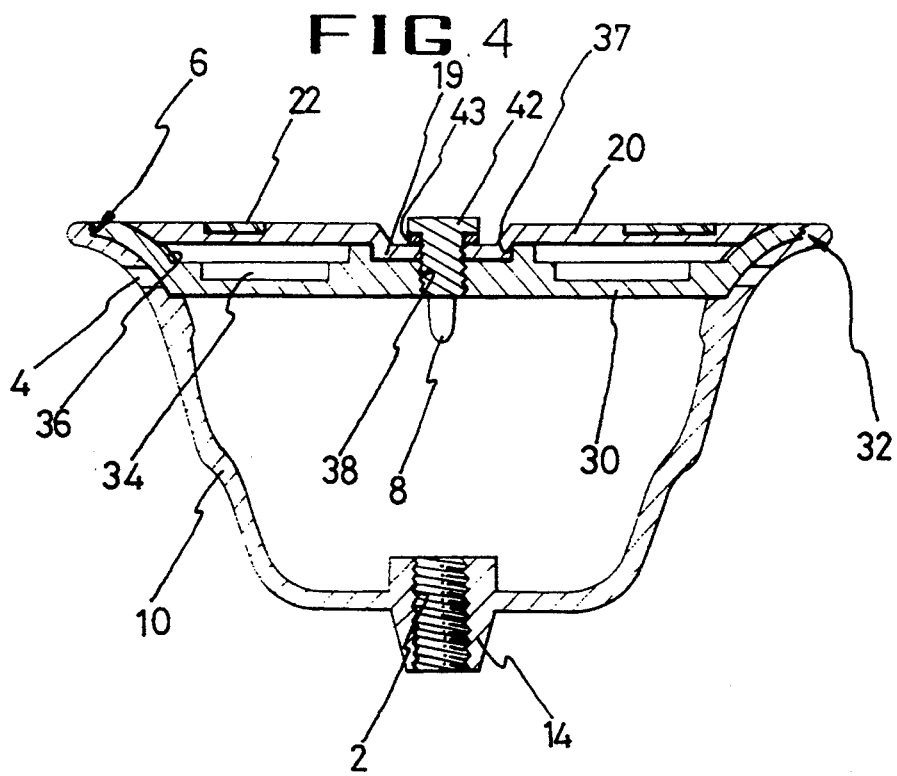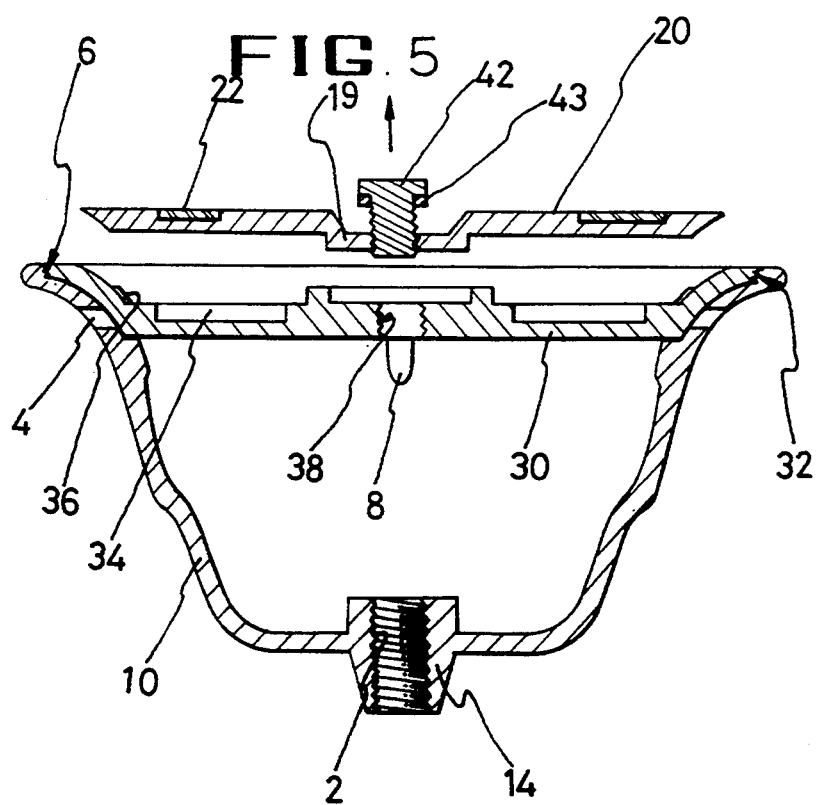

RECEPTACLE ADAPTED FOR CAR

BACKGROUND OF THE INVENTION

The present invention relates to a receptacle which is installed inside the rim of a spare wheel mounted in a car trunk.

Conventionally, hand tools for a car are wrapped in a bag and placed in the car trunk. In this case, the tool bag usually tumbles about and is hidden among other objects carried in the trunk. Therefore, it is difficult for a user to quickly find the tools in the truck of the car.

In case of a portable sign for indicating a car is in trouble on the road, because it is not used frequently, the user does not always note whether or not it is in place.

These and other articles required for maintaining a car are difficult to utilize if they are not kept in a predetermined easily accessible place.

In the ordinary passenger car a spare wheel is carried in a compartment provided inside the trunk and covered with a plate. If the utilization of every space in a car is considered to be a matter of common interest, the space within the rim of a spare wheel which is of considerable volume, should be used. However, to the knowledge of the inventor, no attempt to utilize the space within the rim of the spare wheel effectively has been practiced up to now.

SUMMARY OF THE INVENTION

It is an object of the present invention to utilize the space within the rim of the spare wheel effectively as a storage area and for articles for maintaining a car. In order to accomplish this object, a receptacle adapted for a car comprises a bowl including a circular side wall and a bottom having a fixing hole, the overall shape of the bowl being capable of a substantially snug fit inside the rim of a spare wheel and a cap for detachably covering the bowl.

BRIEF DESCRIPTION OF THE DRAWINGS

FIG. 4 is a sectional view showing the receptacle of FIG. 1;

FIG. 5 is a sectional view showing that an upper part of the cap of the receptacle of FIG. 1 is separated;

DESCRIPTION OF THE PREFERRED EMBODIMENTS

The following is the description with reference to the figures wherein the same numerals are used to represent the same component parts.

Figure 1:
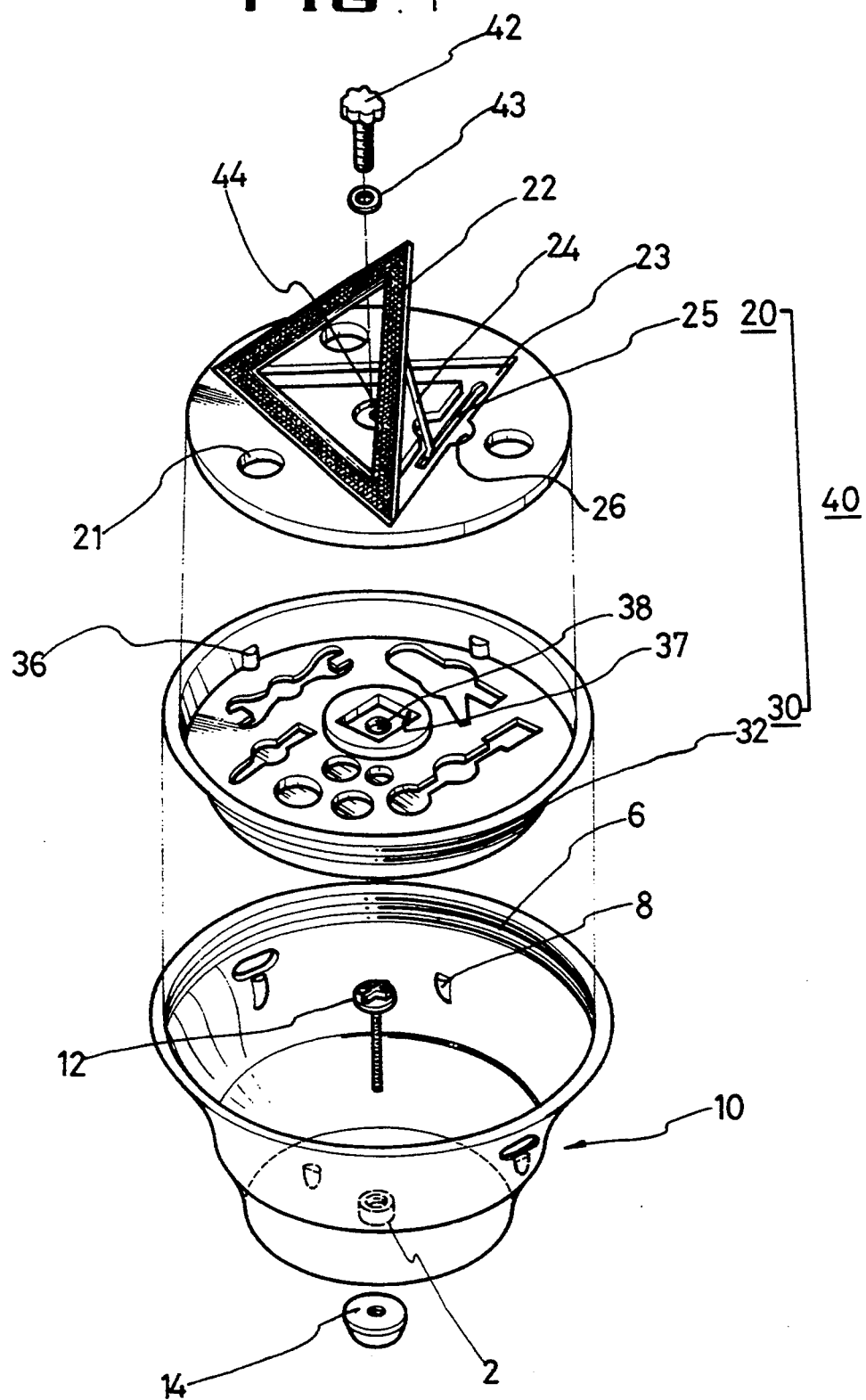
FIG. 1 is an exploded perspective view showing an embodiment of the receptacle according to the present invention.
Figure 2:
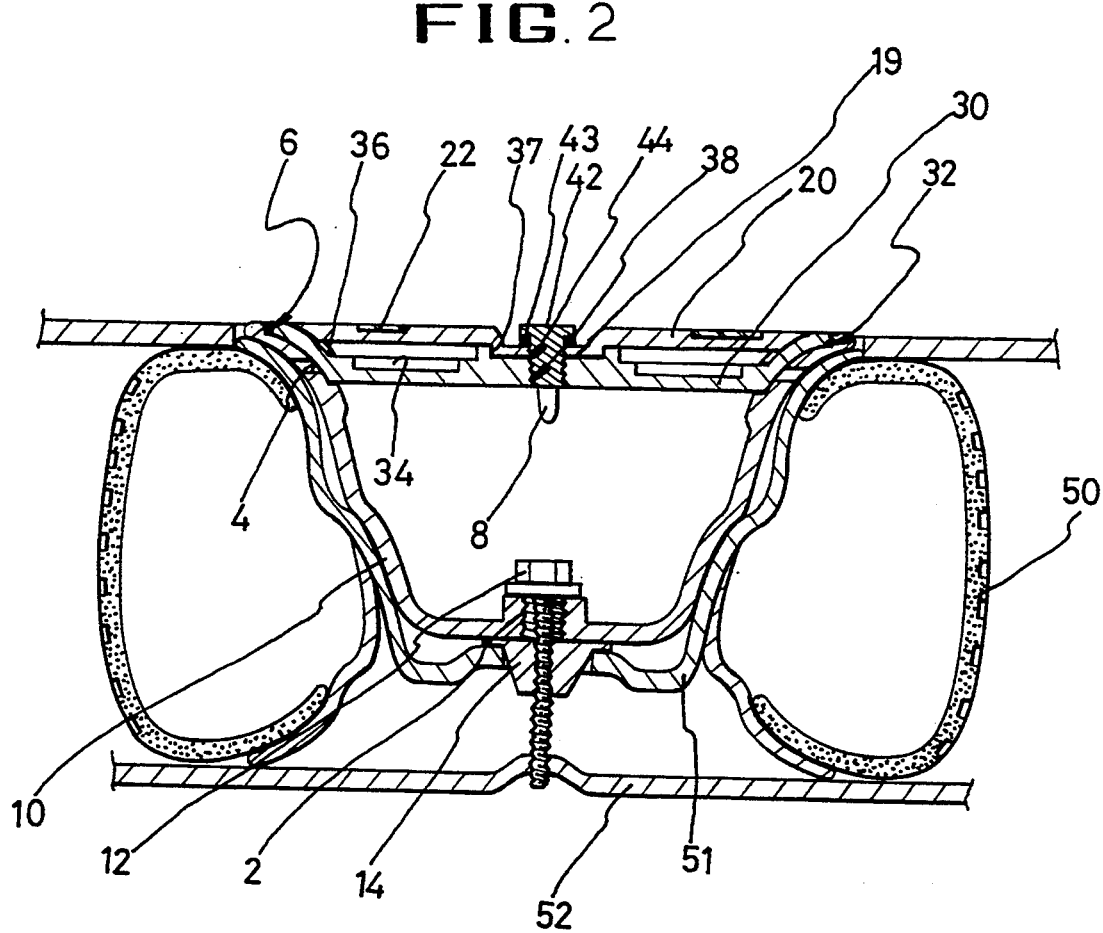
FIG. 2 is a sectional view showing the receptacle of FIG. 1 installed inside the rim of the spare wheel carried in the car trunk.

Referring to FIG. 1, the receptacle comprises a bowl 10 and a cap 40. The bowl 10 includes a circular side wall and a bottom having a fixing hole 2. As shown in FIG. 2, in order that the receptacle may be installed inside a rim 51 of a spare wheel 50 carried in a compartment provided inside a car trunk, the overall shape of the receptacle is designed to be in a substantially snug fit inside the rim.

Two handles for lifting the bowl 10 are provided on the side wall of the bowl 10. Preferably, the handles can be integrally formed on the side wall and are protruded inwardly or can take the shape of openings 4 formed on the side wall.

The cap 40, detachable from the bowl 10, is for a covering. For this purpose, an internal thread 6 is formed on a portion adjacent to an upper extreme of the bowl 10. An external thread 32, which is adapted to engage with the internal thread 6, is formed on an outer periphery of the cap 40.

The cap 40 can be divided into a lower part 30 shaped in the form of a circular tray with a predetermined depth and an upper part 20 for detachably covering the lower part 30 in order to subdivide the space within the receptacle.

A plurality of spacers 8 can be provided on the side wall of the bowl 10 in order to support the cap 40 within the bowl 10, and another plurality of spacers 36 can be provided on the lower part 30 of the cap 40 in order to support the upper part 20. Also, a plurality of depressions 34 of suitable shapes for keeping hand tools in places can be formed on the bottom of the lower part 30.

A sign indicating that a car is in trouble on the road can be provided on the upper part 20 of the cap 40. For this, a depression 23 for snugly embedding the sign 22 within the top of the upper part 20 is formed on the upper part 20, and an indentation 26 is provided on a portion of the depression 23 for easy gripping of the sign 22.

Figure 7:
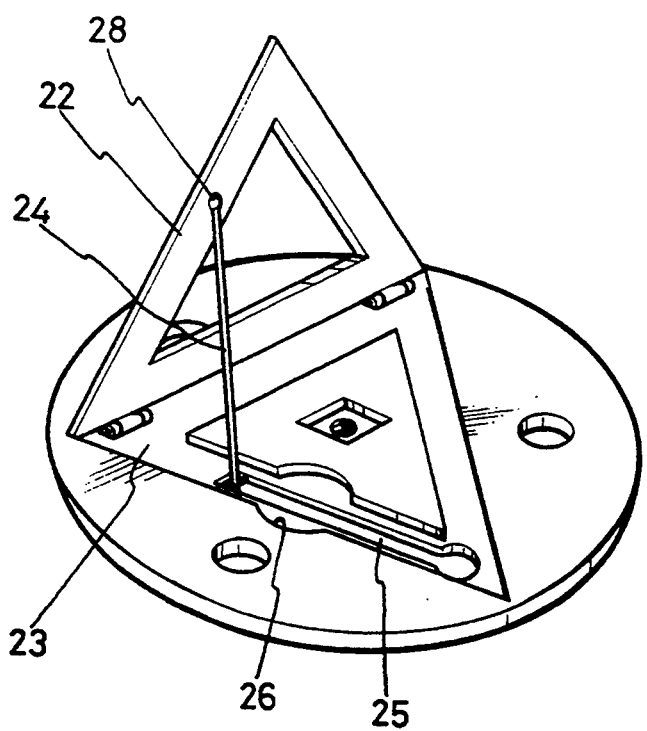
FIG. 7 is a perspective view showing an embodiment of a sign for indicating the car is in trouble on the road and is attached to the cap of the receptacle of FIG. 1 in a set up position.

FIGS. 1 and 7 show the first embodiment of the sign. Here, the sign 22 is attached to the upper part 20 by a hinge, a rod 24 for supporting the sign 22 in a set up position is rotatably attached to the upper part 20 of the cap 40, and another depression 25 for snugly embedding the rod 24 within the bottom of the depression 23 is formed on the depression 23. On the other side of the sign 22 a further depression 28 is formed for fitting a free end of the rod 24 when the rod 24 is set up.

Figure 8:
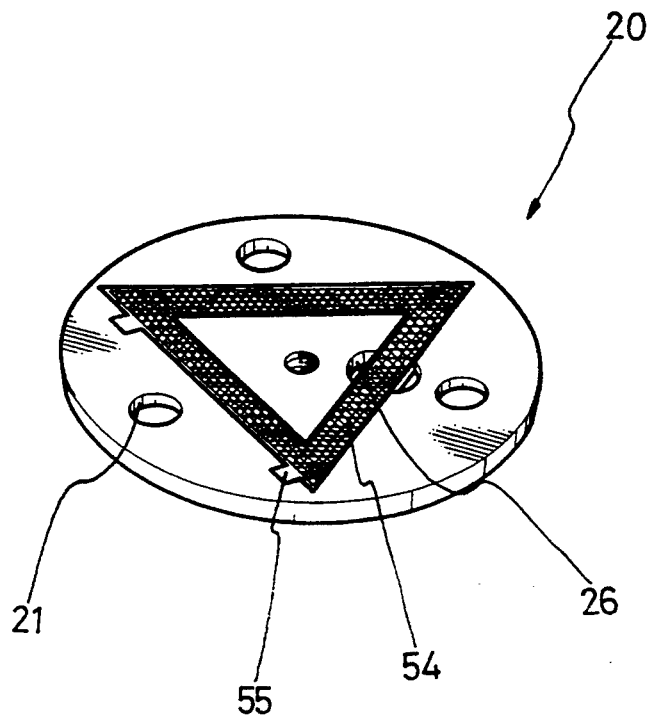
FIG. 8 is a perspective view showing another embodiment of the sign provided on the top of the cap.
Figure 9:
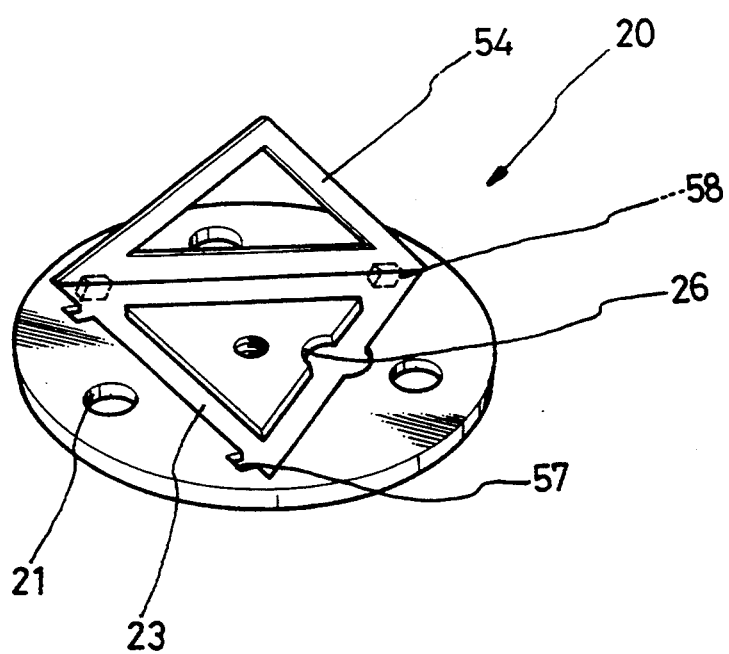
FIG. 9 is a perspective view showing the sign of FIG. 8 in a set up position.

FIGS. 8 and 9 show a second embodiment of the sign. Here, two protrusions 55 are formed at an edge of the sign 26, two depressions 58 whereto the protrusions 55 are fitted when the sign 26 is set up on the upper part 20 of the cap 40 as shown in FIG. 9 are provided on the bottom of the depression 23, and two further depressions 57 for snugly embedding the protrusions 55 when the sign 26 is laid within the depression 23 as shown in FIG. 8 are provided at an edge of the depression 23.

At least one opening 21, which provides a grip for lifting the upper part 20 or the cap 40 or the receptacle, can be formed on the upper part 20 of the cap 40.

A square-shaped protrusion 19 (FIG. 2) and a threaded hole 44 are formed on the bottom of the upper part 20, and a depression 37 and a threaded hole 38 are formed on the top of the lower part 30. A bolt 42 and washer 43 are used to assemble the upper part 20 and the lower part 30 together. When assembled, the depression 37 of the upper part 20 engages with the protrusion 19 of the lower part 30.

It is preferable to make the washer 43 from a packing material and make the fixing hole 2 on the bottom of the bowl 10 suitable for being plugged by means of the bolt 42 and the washer 43. For this, the fixing hole 2 can be threaded internally.

FIG. 2 shows the receptacle according to the present invention installed inside the rim of the spare wheel. The bowl 10 is fitted inside the rim 51 of the spare wheel 50 placed on the bottom 54 of the compartment in the car trunk, with a spare wheel installer 14 which guides the bolt 12 interposed between the bowl 10 and the rim 51, and fixed by means of the bolt 12. It is preferable to form the installer 14 integral with the bottom of the bowl 10 as shown in FIGS. 4 and 5 in order to prevent the installer 14 from being lost.

Figure 3:
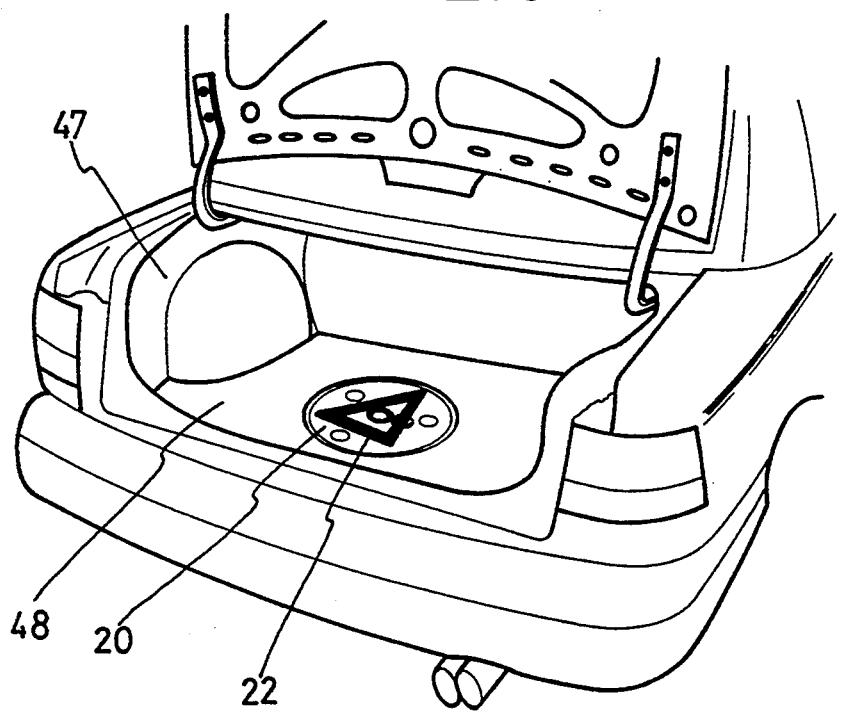
FIG. 3 is a perspective view showing the receptacle of FIG. 1 located at the bottom of the car trunk.

As shown in FIG. 3, the plate 48 covers the bottom of the trunk 47 except the upper part 20 of the cap 40.

Figure 6:
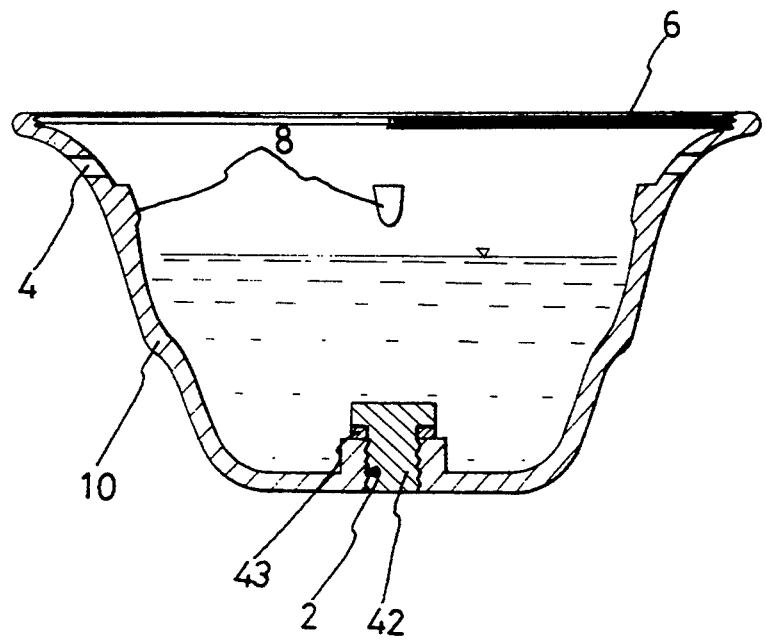
FIG. 6 is a sectional view showing the bowl of the receptacle of FIG. 1 which is used as a liquid reservoir.

FIG. 4 shows the receptacle separated from the rim 51 of the spare wheel 50, and FIG. 5 shows lifting the upper part 20 from the lower part 20 after having the bolt 42 released from the lower part 30 only. In FIG. 6, it is shown that the fixing hole 2 on the bottom of the bowl 10 is plugged with the bolt 42 and the washer 43 and the bowl 10 is used as a liquid reservoir.

By virtue of the construction according to the present invention as described and illustrated heretofore, the receptacle can be used as a container for storing various objects, e.g., duster, containers for lubricant or antifreeze, etc., which would have been easily scattered otherwise; a reservoir for containing liquid, e.g., lubricant when refilling the antifreeze; a toolbox; and a portable traffic sign.

It will be evident to those skilled in the art that the invention is not limited to the details of the foregoing illustrative embodiments and that the present invention may be embodied in other specific forms without departing from the spirit or essential attributes thereof. The present embodiments are therefore to be considered as illustrative and not restrictive.

What is claimed is:

1. A receptacle adapted for use with a spare wheel of a car comprising:
    a bowl including a circular side wall and a bottom having a fixing hole, wherein said bowl has an overall shape capable of a substantially snug fit inside a rim of a spare tire;
    a detachable cap for covering said bowl;
    a sign on said cap for indicating that the car is in trouble on a road;
    a hinge for attaching said sign to the cap; and
    a rod for supporting said sign in a set up position, wherein said rod is rotatably attached to said cap.

2. A receptacle adapted for use with a spare wheel of a car comprising:
    a bowl including a circular side wall and a bottom having a fixing hole, wherein said bowl has an overall shape capable of a substantially snug fit inside a rim of a spare tire;
    a detachable cap for covering said bowl; and
    a sign on said cap for indicating that the car is in trouble on a road; wherein said sign includes at least one protrusion formed at an edge of said sign, wherein at least one depression is formed on an upper portion of said cap, and wherein said protrusion is fitted into said depression when said sign is set up on the upper portion of said cap.

3. A receptacle adapted for use with a spare wheel of a car comprising:
    a bowl including a circular side wall and a bottom having a fixing hole, wherein said bowl has an overall shape capable of a substantially snug fit inside a rim of a spare tire;
    a detachable cap for covering said bowl, wherein said cap includes:
        a lower part shaped in a form of a circular tray with a predetermined depth; and
        an upper part for detachably covering said lower part;
    a sign for indicating said car is in trouble on a road being connected to said upper part of said cap by means of a hinge;
    and a rod rotatably attached to said upper part of said cap for supporting said sign in a set up position.

4. The receptacle as claimed in claim 3, wherein at least one protrusion is formed at an edge of said sign and at least one depression is formed on said upper part of said cap, and wherein the protrusion is fitted into the depression when said sign is set up on said upper part of the cap.

5. The receptacle as claimed in claim 3, wherein depressions of suitable shapes for keeping hand tools in place are formed on said lower part.

6. The receptacle as claimed in claim 3, comprising:
    a threaded hole formed on said upper part and said lower part, respectively, of said cap; and
    a bolt for assembling said upper part and said lower part together, wherein said bolt is suitable for plugging said fixing hole in said bottom of said bowl.

7. The receptacle as claimed in claim 3, wherein a square-shaped protrusion is formed on a bottom of said upper part and a depression which is adapted to engage with said protrusion is formed on a top of said lower part.

* * * * *